US009241193B2

(12) United States Patent
Takemura

(10) Patent No.: US 9,241,193 B2
(45) Date of Patent: Jan. 19, 2016

(54) APPARATUS, METHOD AND SYSTEM FOR GENERATING METADATA FOR CONTENT TO BE SHARED

(75) Inventor: Tomoaki Takemura, Tokyo (JP)

(73) Assignee: Sony Corporation (JP)

( * ) Notice: Subject to any disclaimer, the term of this patent is extended or adjusted under 35 U.S.C. 154(b) by 774 days.

(21) Appl. No.: 13/262,528

(22) PCT Filed: Mar. 25, 2010

(86) PCT No.: PCT/JP2010/055272
§ 371 (c)(1),
(2), (4) Date: Sep. 30, 2011

(87) PCT Pub. No.: WO2010/116894
PCT Pub. Date: Oct. 14, 2010

(65) Prior Publication Data
US 2012/0023204 A1    Jan. 26, 2012

(30) Foreign Application Priority Data
Apr. 7, 2009    (JP) ................. 2009-092905

(51) Int. Cl.
G06F 15/16    (2006.01)
H04N 21/4788    (2011.01)
G06F 17/30    (2006.01)
H04N 21/63    (2011.01)

(52) U.S. Cl.
CPC ...... H04N 21/4788 (2013.01); G06F 17/30038 (2013.01); H04N 21/632 (2013.01)

(58) Field of Classification Search
USPC ....................................................... 709/217
See application file for complete search history.

(56) References Cited

U.S. PATENT DOCUMENTS

| 6,035,323 | A | * | 3/2000 | Narayen | G06F 17/30893 709/201 |
| 6,629,100 | B2 | * | 9/2003 | Morris et al. | |
| 7,441,113 | B2 | * | 10/2008 | Chong et al. | 713/2 |
| 7,653,689 | B1 | * | 1/2010 | Champagne et al. | 709/206 |
| 7,680,768 | B2 | | 3/2010 | Koike et al. | |
| 2005/0278745 | A1 | * | 12/2005 | Fukuda | H04N 5/44543 725/55 |
| 2009/0138441 | A1 | * | 5/2009 | Valentine | G06F 17/30864 |

FOREIGN PATENT DOCUMENTS

| JP | 2005-522786 A | 7/2005 |
| JP | 2005-236462 A | 9/2005 |
| JP | 2006-190205 A | 7/2006 |
| JP | 2007-317107 A | 12/2007 |
| JP | 2007-323398 A | 12/2007 |

* cited by examiner

Primary Examiner — Alicia Baturay
(74) Attorney, Agent, or Firm — Lerner, David, Littenberg, Krumholz & Mentlik, LLP

(57) ABSTRACT

The present invention relates to a communication apparatus, a communication method, and a communication system able to share content on the basis of metadata. A storage unit 105 retains content. A registration processor 106 generates metadata related to the content and registers the generated metadata in a database. An uploader 104 requests another communication apparatus via a network for content retained by the other communication apparatus on the basis of metadata generated by the other communication apparatus. A downloader 103 supplies content retained by the storage unit 105 via the network to the other communication apparatus requesting on the basis of metadata generated by the registration processor 106. The present invention can be applied to a recording and playback apparatus able to record or play back content, for example.

12 Claims, 9 Drawing Sheets

US 9,241,193 B2

APPARATUS, METHOD AND SYSTEM FOR GENERATING METADATA FOR CONTENT TO BE SHARED

CROSS-REFERENCES TO RELATED APPLICATIONS

The present application is a national phase entry under 35 U.S.C. §371 of International Application No. PCT/JP2010/055272 filed Mar. 25, 2010, published on Oct. 14, 2010 as WO 2010/116894 A1, which claims priority from Japanese Patent Application No. JP 2009-092905 filed in the Japanese Patent Office on Apr. 7, 2009.

TECHNICAL FIELD

The present invention relates to a communication apparatus, a communication method, and a communication system, and more particularly, to a communication apparatus, a communication method, and a communication system configured to enable sharing of content such as video among a plurality of communication apparatus.

BACKGROUND ART

Conventionally, there exists for example a sharing system wherein (data expressing) owned content is uploaded to a given server and the uploaded content is shared by a plurality of user terminals (see PTL 1, for example).

According to a conventional sharing system, sharing is possible by for example a user terminal selecting given content on the basis of metadata such as the title or genre of the content, and downloading the selected content from a given server.

Herein, metadata is for example generated on the basis of generative information such as electronic program guide (EPG) data corresponding to content obtained from received broadcast waves.

CITATION LIST

Patent Literature

PTL 1: Japanese Unexamined Patent Application Publication No. 2005-236462

SUMMARY OF INVENTION

Technical Problem

However, although information to the extent of a file name can be added to content, etc. obtained by a user personally recording with a video camera, etc., generative information such as corresponding EPG data does not exist, and thus metadata cannot be generated.

For this reason, in a conventional sharing system, content for which generative information does not exist could not be downloaded from a given server and shared on the basis of metadata.

The present invention, being devised in light of such circumstances, is configured to generate metadata even with respect to content for which generative information does not exist, and to enable sharing on the basis of generated metadata.

Solution to Problem

A communication apparatus in a first aspect of the present invention is a communication apparatus connected via a network to another communication apparatus configured similarly to itself, including retaining means for retaining content, generating means for generating metadata related to the content, registering means for registering the metadata in a database, requesting means for requesting the other communication apparatus via the network for content retained by the other communication apparatus on the basis of metadata generated by the other communication apparatus, and supplying means for supplying via the network the content retained by the retaining means to the other communication apparatus requesting on the basis of metadata generated by the generating means.

In the case where generative information for generating the metadata is associated with the content, the generating means may generate the metadata on the basis of the generative information, and in the case where the generative information is not associated with the content, the generating means may generate the metadata on the basis of the generative information input by user input operations.

Learning means for learning preference information expressing preferences for content on the basis of the metadata may be additionally provided, and the registering means may register the metadata and the preference information in the database.

Metadata related to content retained by the other communication apparatus may also be registered in the database, and list acquiring means for acquiring a content list, which is a list of content, generated on the basis of the preference information and the metadata registered in the database, may be additionally provided.

The communication apparatus may be connected via the network to a meta sharing server that retains the database. The registering means may register the metadata and the preference information in the database via the network. The list acquiring means may request supply of the content list from the meta sharing server, which generates the content list on the basis of the preference information and the metadata registered in the database, and acquire the content list generated and supplied by the meta sharing server in response to the request for supply of the content list.

The requesting means may request the other communication apparatus for content selected by the user on the basis of the content list acquired by the list acquiring means.

The communication apparatus may be connected via the network to a plurality of the other communication apparatus, and in the case where the content selected by the user is being retained by a plurality of the other communication apparatus, the requesting means may request a given other communication apparatus for the content selected by the user.

The registering means may also register, in the database, the communication rate when the content is supplied by the supplying means.

The respective communication rates of the plurality of other communication apparatus may also be registered in the database. Determining means for determining, on the basis of the communication rates registered in the database, the other communication apparatus from among the plurality of other communication apparatus that will supply the content with the fastest communication rate may also be provided. The requesting means may request the other communication apparatus determined by the determining means for the content selected by the user.

Preference information expressing preferences for content learned on the basis of metadata related to content retained by the other communication apparatus may also be registered in the database. List generating means for generating a content list, which is a list of content, on the basis of the preference information and the metadata registered in the database, and in response to a request from the other communication apparatus, and list supplying means for supplying the content list generated by the list generating means to the other communication apparatus, may be additionally provided.

Computing means for computing, in response to the metadata being registered in the database by the registering means, a degree of preference expressing the degree of preference for the content corresponding to the metadata on the basis of the preference information registered in the database, and reporting means for reporting to the other communication apparatus via the network that the retaining means is retaining the content in the case where the degree of preference is equal to or greater than a given threshold value, may be additionally provided.

The registering means may also register, in the database, permission information indicating that supply of the content to the other communication apparatus is permitted or denied, and the supplying means may supply the content to the other communication apparatus in the case where the permission information registered in the database indicates that supply of the content to the other communication apparatus is permitted.

A communication method in a first aspect of the present invention is a communication method for a communication apparatus connected via a network to another communication apparatus, the communication apparatus including retaining means, generating means, registering means, requesting means, and supplying means, the method including the steps of the generating means generating metadata related to the content retained by the retaining means, the registering means registering the metadata in a database, the requesting means requesting the other communication apparatus via the network for content retained by the other communication apparatus on the basis of metadata generated by the other communication apparatus, and the supplying means supplying via the network the content retained by the retaining means to the other communication apparatus requesting on the basis of metadata generated by the generating means.

According to a first aspect of the present invention, metadata related to retained content is generated, and the generated metadata is registered in a database. On the basis of metadata generated by another communication database, the other communication apparatus is requested via the network for content retained by the other communication apparatus. The retained content is supplied via the network to the other communication apparatus requesting on the basis of generated metadata.

A communication system in a second aspect of the present invention is a communication system comprising a meta sharing server that retains a database and a communication apparatus connected via a network to the meta sharing server. The communication apparatus includes retaining means for retaining content, generating means for generating metadata related to the content, learning means for learning preference information expressing preferences for content on the basis of the metadata, registering means for registering, via the network, the metadata and the preference information in the database where metadata generated by a plurality of communication apparatus is registered, requesting means for requesting the meta sharing server via the network for a content list, which is a list of content, and acquiring means for acquiring the content list supplied from the meta sharing server in response to a request by the requesting means. The meta sharing server includes list generating means for generating the content list on the basis of the metadata and the preference information registered in the database in response to a request by the requesting means, and supplying means for supplying the content list to the communication apparatus via the network.

According to a second aspect of the present invention, content is retained, and metadata related to the retained content is generated. On the basis of the metadata, preference information expressing preferences for content is learned, and the metadata and the preference information is registered via the network in the database where metadata generated by a plurality of communication apparatus is registered. A content list, which is a list of content, is requested via the network from the meta sharing server, and the content list supplied from the meta sharing server in response to a request is acquired by the communication apparatus. Also, the content list is generated on the basis of the metadata and preference information registered in the database and in response to a request from a communication apparatus, and the generated content list is supplied via the network to the communication apparatus by the meta sharing server.

Advantageous Effects of Invention

According to the present invention, metadata is generated even with respect to content for which generative information does not exist, and content can be shared on the basis of generated metadata.

DESCRIPTION OF EMBODIMENTS

Hereinafter, an embodiment for carrying out the invention (hereinafter called the present embodiment) will be explained. Herein, the explanation will proceed in the following order.

1. Present embodiment
2. Modifications

1. Present Embodiment

[Exemplary Configuration of Communication System]

Figure 1:
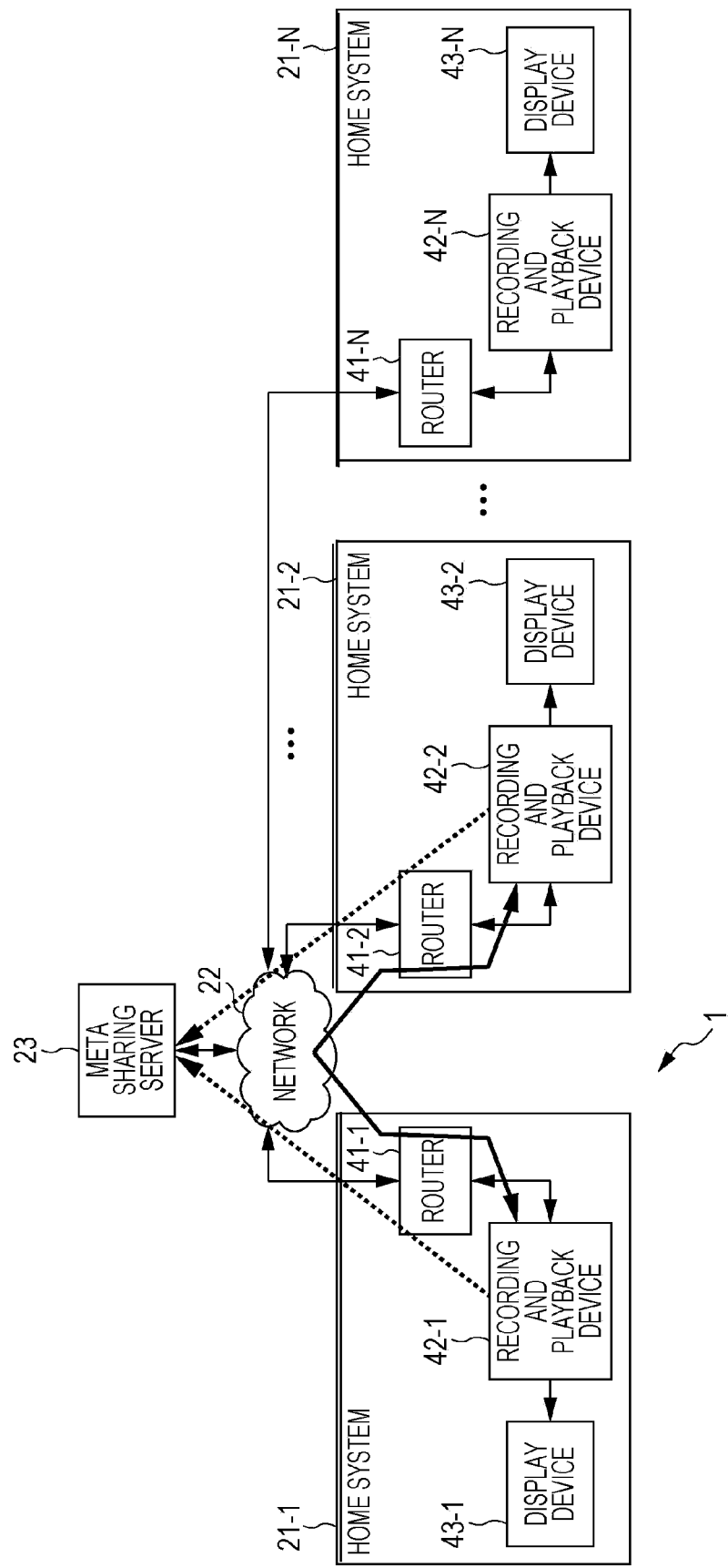
FIG. 1 is a block diagram illustrating an exemplary configuration of the present embodiment, a communication system 1.

FIG. 1 illustrates an exemplary configuration of the present embodiment, a communication system 1.

This communication system 1 consists of in-home systems 21-$n$ (where n is a natural number from 1 to N) installed in users' homes, a network 22, and a meta sharing server 23.

The in-home systems 21-*n* consist of routers 41-*n*, recording and playback devices 42-*n*, and display devices 43-*n*.

Herein, in FIG. 1, arrows indicated by bold solid lines indicate the flow of content. Also, arrows indicated by bold broken lines indicate the flow of preference information and metadata corresponding to the content.

Herein, metadata refers to data that includes the title of the content, a content identification (ID) for uniquely identifying the content, the duration, the genre, a thumbnail image representing the contents of the content, and copy control information indicating copy permission for the content based on copyright, etc. Herein, metadata is stated by a programming language such as Extensible Markup Language (XML).

Also, preference information refers to information generated on the basis of a user's content viewing tendencies.

Herein, the recording and playback devices 42-1 to 42-N will be simply referred to as the recording and playback devices 42 in cases where it is not necessary to individually distinguish among the recording and playback devices 42-1 to 42-N. This is also similar for the routers 41-1 to 41-N and the display devices 43-1 to 43-N.

The router 41 mediates data exchange between the recording and playback device 42 and the network 22.

The recording and playback device 42, according to user operations, for example, records personal data, etc. that has been personally recorded by the user with a video camera, etc. The recording and playback device 42 records the personal data as content in an internally housed hard disk, etc.

Also, the recording and playback device 42, according to user operations, for example, extracts and records content and EPG data expressing the title and detailed information, etc. of that content from received broadcast waves.

Furthermore, the recording and playback device 42, according to user operations, for example, downloads and records content and electronic contents guide (ECG) data expressing the title and detailed information, etc. of that content via the router 41 from a content providing server (not illustrated) that provides content and which is connected to the network 22.

Also, the recording and playback device 42, according to user operations, for example, plays back recorded content.

The recording and playback device 42, generates content metadata on the basis of EPG data and ECG data corresponding to the recorded content, or input data that has been input by a user.

Also, the recording and playback device 42 generates user preference information on the basis of generated metadata.

The recording and playback device 42 associates generated metadata and preference information with a device ID for uniquely identifying the recording and playback device 42, and supplies the information to the meta sharing server 23 via the router 41 and the network 22.

Herein, it is possible to adopt a global Internet Protocol (IP) address capable of uniquely identifying the recording and playback device 42 connected to the network 22, a unique manufacturer's serial number attached in the stage of manufacturing the recording and playback device 42, etc. as the device ID.

Hereinafter, in the present embodiment, a global IP address is taken to be implemented as the device ID.

Also, the recording and playback device 42 supplies to and causes the display device 43 to display a content list supplied from the meta sharing server via the network 22 and the router 41 which reflects the preferences of the user of the recording and playback device 42.

Furthermore, the recording and playback device 42 downloads content from other recording and playback devices 42 on the basis of a content list supplied from the meta sharing server via the network 22 and the router 41.

The display device 43 displays content lists, content, etc. from the recording and playback device 42.

The network 22 is an intranet, the Internet, etc., and mutually connects the routers 41-1 to 41-N and the meta sharing server.

The meta sharing server 23 associates and stores (retains) metadata and preference information supplied from the recording and playback device 42 via the router 41 and the network 22 with the device ID of the originating recording and playback device 42.

Also, the meta sharing server 23, in response to being supplied with a list request signal that requests transmission of a content list, generates a content list reflecting the preferences of a user using the recording and playback device 42 on the basis of retaining preference information and metadata.

Additionally, the meta sharing server 23 supplies a generated content list to the recording and playback device 42 via the network 22 and the router 41.

In the recording and playback device 42 a content list supplied from the meta sharing server 23 via the network 22 and the router 41 is supplied to and made to be displayed by the display device 43.

[Explanation of Operation of Meta Sharing Server 23]

Next, a method will be explained with reference to FIG. 2 whereby the meta sharing server 23 generates a content list reflecting the preferences of the user of the recording and playback device 42 on the basis of retained metadata and preference information.

Figure 2:
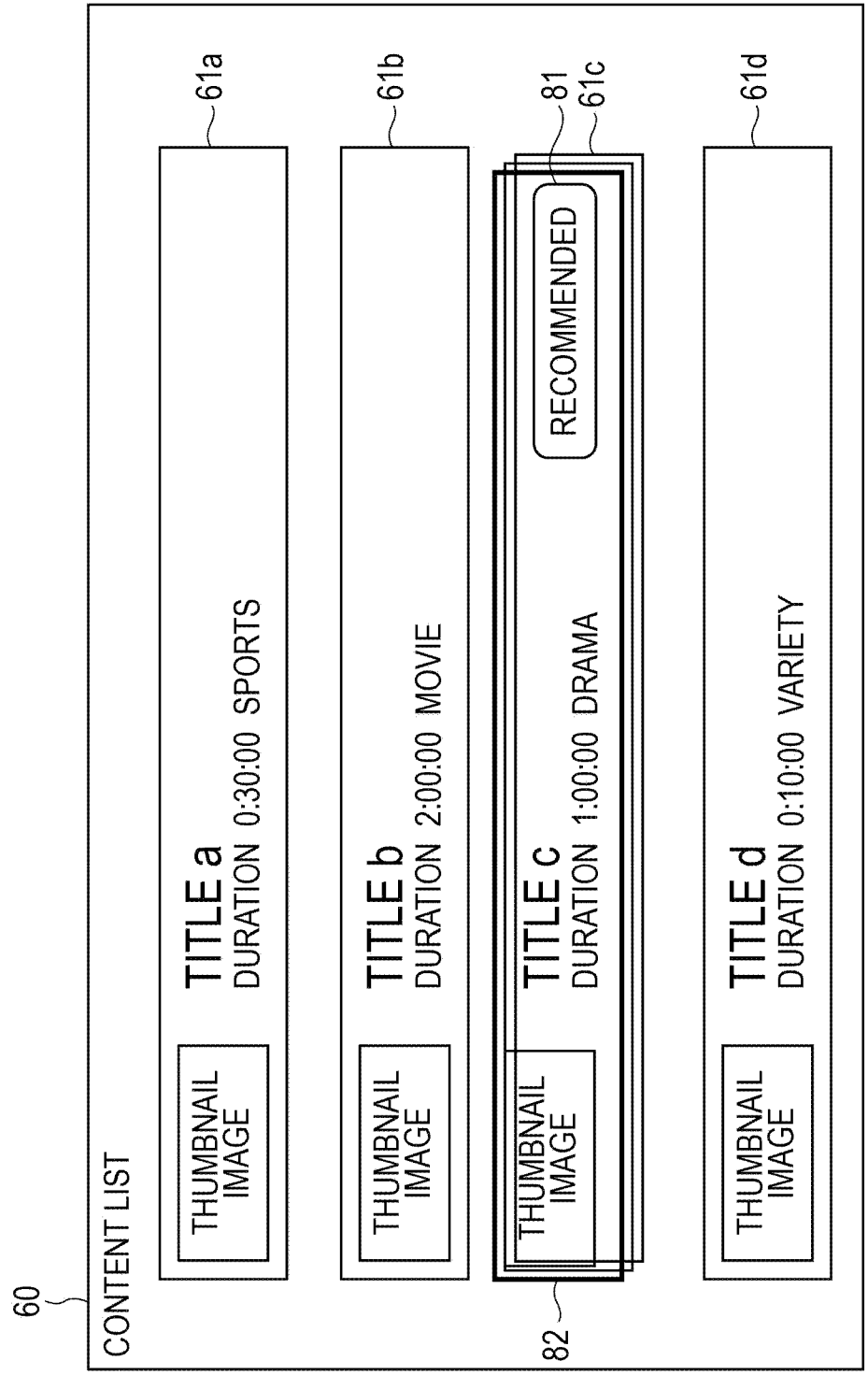
FIG. 2 is a diagram illustrating exemplary display of a content list.

FIG. 2 illustrates exemplary display of a content list generated by the meta sharing server 23.

In the exemplary display of a content list 60 illustrated in FIG. 2, a content list consisting of a list of content displays 61*a* to 61*d* is displayed. In each content display are displayed a thumbnail image representing the contents of the content, the title, the duration, and the genre.

Also, in the content display 61*c*, a recommended mark 81 recommending user viewing (playback) is displayed.

The meta sharing server 23, in response to a list request signal from the recording and playback device 42, conducts what is called collaborative filtering on the basis of retained metadata and preference information, and presents recommended content to the user of the recording and playback device 42.

In other words, the meta sharing server 23 may for example generate a content list representing a list of content displays 61*a* to 61*d* for content respectively retained in recording and playback devices 42-1 to 42-N, on the basis of metadata associated with the respective device IDs of the recording and playback devices 42-1 to 42-N.

Additionally, the meta sharing server 23 adds a recommended mark 81 to the content display 61*c* in the generated content list on the basis of the preference information associated with the device ID of a recording and playback device 42, and supplies the content list to the recording and playback device 42 via the network 22 and the router 41.

The recording and playback device 42 supplies the content list from the router 41 to the display device 43 and causes it to be displayed.

The user makes a selection operation using a cursor 82 while referring to the display screen of the display device (a screen in which the exemplary display 60 is displayed). In so doing, the user selects the content display 61*c*, etc. from among the content displays 61*a* to 61*d* displayed on the display screen of the display device 43, for example.

The recording and playback device 42 downloads (acquires) the content corresponding to the content display 61c selected by the user's selection operation from another recording and playback device 42 retaining that content.

[Exemplary Configuration of Recording and Playback Device]

Figure 3:
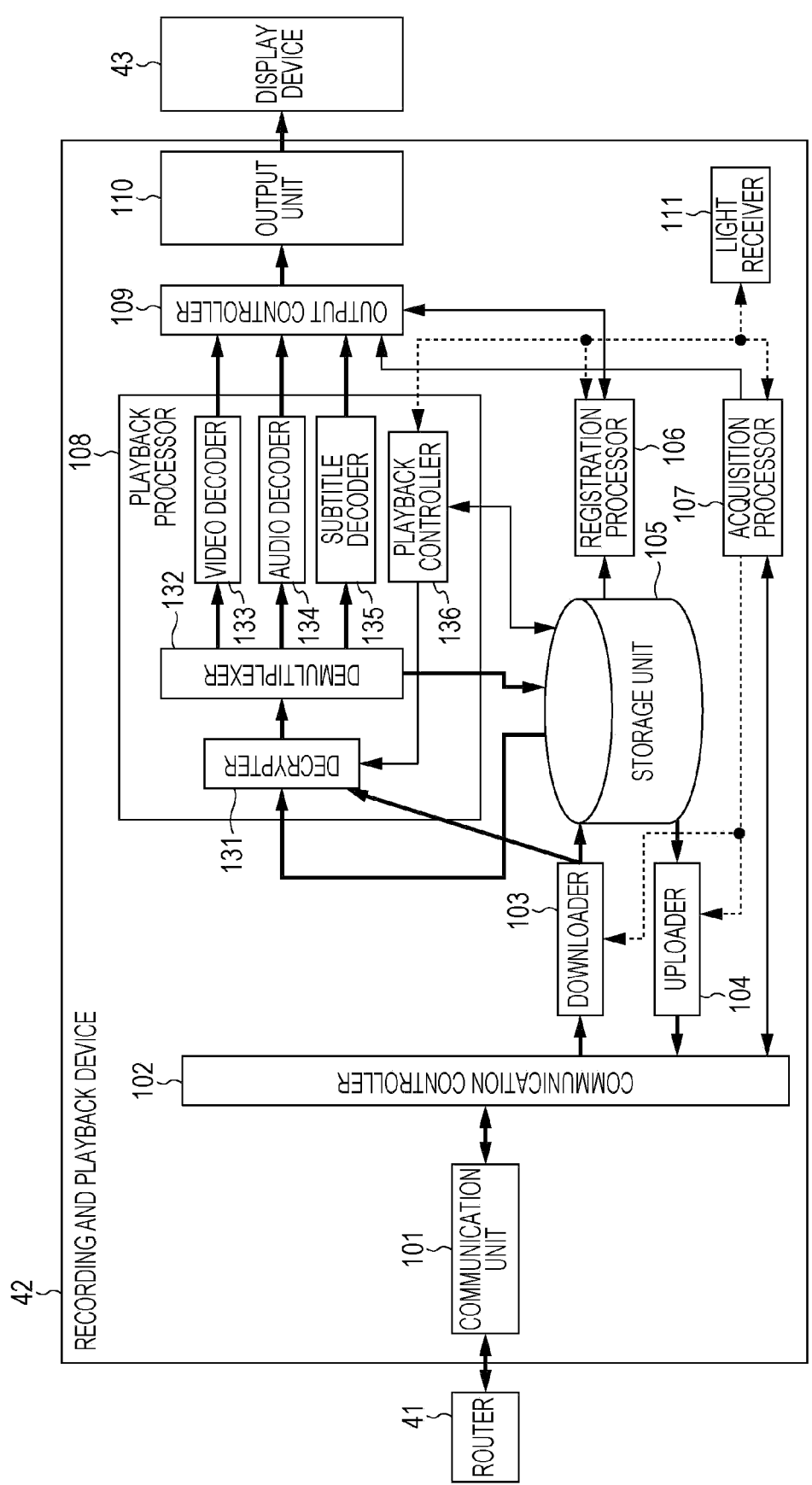
FIG. 3 is a block diagram illustrating a detailed exemplary configuration of a recording and playback device 42.

Next, FIG. 3 illustrates a detailed exemplary configuration of a recording and playback device 42.

The recording and playback device 42 consists of a communication unit 101, a communication controller 102, a downloader 103, an uploader 104, a storage unit 105, a registration processor 106, an acquisition processor 107, a playback processor 108, an output controller 109, an output unit 110, and a light receiver 111.

Herein, in FIG. 3, arrows indicated by bold solid lines indicate the flow of content. Also, arrows indicated by thin broken lines indicate the flow of operation signals for controlling the registration processor 106, the acquisition processor 107, or the playback controller 136 according to user operations.

Furthermore, arrows indicated by thin solid lines indicate the flow of content and data that differs from operation signals.

The communication unit 101 mediates data exchange between the router 41 and the communication controller 102.

The communication controller 102, controlling the communication unit 101, conducts communication using a protocol such as Hypertext Transfer Protocol Security (HTTPS) or HTTP.

In other words, the communication controller 102 may for example receive content, etc. supplied from the router 41 via the communication unit 101, and supply it to the downloader 103.

Also, the communication controller 102 receives a content list generated by the meta sharing server 23 and supplied from the router 41 via the communication unit 101, and supplies it to the acquisition processor 107.

Furthermore, the communication controller 102 supplies content addressed to the meta sharing server 23, metadata of that content, or user preference information, etc. supplied from the uploader 104 to the router 41 via the communication unit 101. At this point, the router 41 transmits the content, metadata of that content, or user preference information, etc. from the communication unit 101 to the meta sharing server 23 via the network 22.

Also, the communication controller 102 supplies content addressed to another recording and playback device 42 supplied from the uploader 104 to the router 41 via the communication unit 101. At this point, the router 41 transmits the content from the communication unit 101 to another recording and playback device 42 via the network 22.

Furthermore, the communication controller 102 supplies a download request supplied from the acquisition processor 107 for content retained by another recording and playback device 42 to the router 41 via the communication unit 101. At this point, the router 41 transmits the download request from the communication unit 101 to another recording and playback device 42 via the network 22.

The downloader 103, following control by the acquisition processor 107, supplies content, etc. from the communication controller 102 to the storage unit 105 and causes it to be stored. Also, the downloader 103 supplies the content from the communication controller 102 to the playback processor 108.

The uploader 104 reads out content, metadata, or preference information from the storage unit 105 and supplies to the communication controller 102.

The storage unit 105 consists of a hard disk, etc., for example, and retains content from the uploader 104, ECG data corresponding to that content, content extracted from broadcast waves received by an antenna not illustrated, EPG data corresponding to that content, and preference information and metadata from the registration processor 106, etc.

Also, the storage unit 105 retains in advance a decryption key for decrypting content.

Furthermore, the storage unit 105 retains a playback history, etc. indicating the amount of time and number of times retained content has been played back, etc.

The registration processor 106 generates content metadata on the basis of EPG and ECG data corresponding to content retained in the storage unit 105 or input data input by input operations by the user, supplies it to the storage unit 105 and causes it to be stored.

Also, the registration processor 106 computes user preference information on the basis of a metadata retained in the storage unit 105 and a playback history, etc. of content corresponding to the metadata, supplies it to the storage unit 105 and causes it to be stored.

Additionally, the registration processor 106 conducts a database registration process that registers metadata and user preference information in the meta sharing server 23 for content stored in the storage unit 105.

Herein, details of a content registration process will be discussed later with reference to the flowchart in FIG. 5.

Also, the registration processor 106 generates a content list of content retained in the storage unit 105 on the basis of metadata retained in the storage unit 105, and supplies it to the output controller 109.

Furthermore, in the case where a content list generated by the registration processor 106 is being displayed by the display device 43, the registration processor 106 edits the generated content list on the basis of operation signals supplied to the registration processor 106 from the light receiver 111 in accordance with editing operations by the user, and supplies it to the output controller 109.

The acquisition processor 107 generates a list request signal addressed to the meta sharing server 23 on the basis of operation signals supplied from the light receiver 111 in accordance with user operations, and supplies it to the router 41 via the communication controller 102 and the communication unit 101. At this point, the router 41 transmits the list request signal from the communication unit 101 to the meta sharing server 23 via the network 22.

The acquisition processor 107, in response to the transmission of a list request signal, acquires a content list (FIG. 2) supplied from the meta sharing server 23 via the network 22, the router 41, the communication unit 101, and the communication controller 102, and supplies it to the output controller 109.

Also, the acquisition processor 107, in response to an operation signal indicating that one of the content displays displayed in the acquired content list has been selected being supplied from the light receiver 111 to the acquisition processor 107, and conducts a content acquisition process that controls the downloader 103, etc. and causes content corresponding to the selected content display to be downloaded from another recording and playback device 42.

Herein, details of a content acquisition process will be discussed later with reference to the flowchart in FIG. 7.

Furthermore, the acquisition processor 107 supplies a download request for another recording and playback device 42 to the communication controller 102.

Also, the acquisition processor 107, in response to a downloaded request from another recording and playback device 42 being supplied from the communication controller 102, controls the uploader 104, and causes content in accordance with the download request to be read out from the storage unit 105 and transmitted, addressed to another recording and playback device 42.

The playback processor 108 plays back content from the downloader 103 and content stored in the storage unit 105.

The playback processor 108 consists of a decrypter 131, a demultiplexer 132, a video decoder 133, an audio decoder 134, a subtitle decoder 135, and a playback controller 136.

The decrypter 131 is supplied with content from the downloader 103 or the storage unit 105.

The decrypter 131 decrypts content from the downloader 103 and content read out from the storage unit 105 on the basis of a decryption key from the playback controller 136, and supplies decrypted content to the demultiplexer 132.

The demultiplexer 132 extracts a video signal, an audio signal, and a subtitle signal from content from the decrypter 131. Then, the demultiplexer 132 supplies the extracted video signal to the video decoder 133, the audio signal to the audio decoder 134, and the subtitle signal to the subtitle decoder 135, respectively.

The video decoder 133 decodes a video signal from the demultiplexer 132 and supplies it to the output controller 109.

The audio decoder 134 decodes an audio signal from the demultiplexer 132 and supplies it to the output controller 109.

The subtitle decoder 135 decodes a subtitle signal from the demultiplexer 132 and supplies it to the output controller 109.

The playback controller 136, in response to an operation signal instructing content playback being supplied from the light receiver 111, reads out a decryption key from the storage unit 105 and supplies it to the decrypter 131.

Then, the playback controller 136 controls the decrypter 131, the demultiplexer 132, the video decoder 133, the audio decoder 134, and the subtitle decoder 135 to play back content output from the downloader 103 or the storage unit 105.

Also, the playback controller 136 generates a playback history of played back content, and supplies it to the storage unit 105 and causes it to be stored.

The output controller 109 causes a video signal from the video decoder 133 and a subtitle signal from the subtitle decoder 135 to be output to the display device 43 via the output unit 110. Also, the output controller 109 causes an audio signal from the audio decoder 134 to be output to speakers not illustrated via the output unit 110.

Furthermore, the output controller 109 causes a content list from the registration processor 106 or the acquisition processor 107 to be output to the display device 43 via the output unit 110.

The output unit 110 outputs a video signal and a subtitle signal from the output controller 109, or a content list from the output controller 109, to the display device 43.

Also, the output unit 110 outputs an audio signal from the output controller 109 to speakers not illustrated.

The light receiver 111 receives an operation signal from a remote control not illustrated, and supplies it to the registration processor 106, the acquisition processor 107, or the playback controller 136.

[Exemplary Configuration of Meta Sharing Server]

Figure 4:
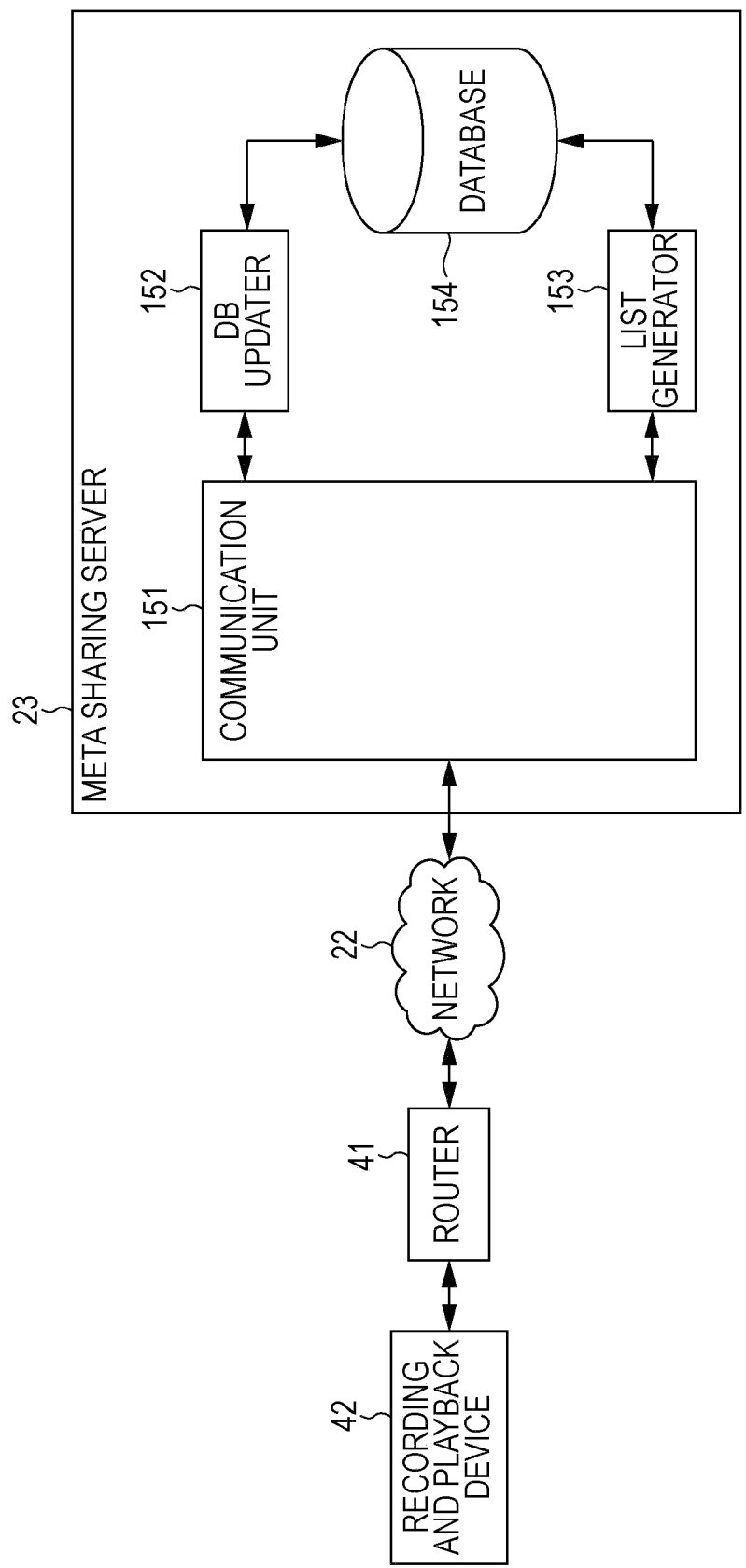
FIG. 4 is a block diagram illustrating a detailed exemplary configuration of a meta sharing server 23.

Next, FIG. 4 illustrates a detailed exemplary configuration of a meta sharing server 23.

The meta sharing server 23 consists of a communication unit 151, a DB updater 152, a list generator 153, and a database 154.

The communication unit 151 supplies the DB updater 152 with preference information and metadata associated with a device ID of a recording and playback device 42, which are supplied from the recording and playback device 42 via the router 41 and the network 22.

Also, the communication unit 151 supplies report information supplied from the DB updater 152, which reports that given content is shareable, to a recording and playback device 42 via the network 22 and the router 41.

Furthermore, the communication unit 151 supplies the list generator 153 with a list request signal supplied from a recording and playback device 42 via the router 41 and the network 22.

Also, the communication unit 151 supplies a recording and playback device 42 with a content list from the list generator 153 via the network 22 and the router 41.

The DB updater 152 conducts a database update process that updates a meta sharing table and a preference table retained in the database 154 on the basis of metadata and preference information from the communication unit 151, and also reports report information to a given recording and playback device 42 on the basis of a preference table retained in the database 154.

Herein, details of a database update process conducted by the DB updater 152 will be discussed later with reference to the flowchart in FIG. 6.

Herein, a meta sharing table refers to a table in which metadata associated with device IDs is stored. Also, a preference table refers to a table in which preference information associated with device IDs is stored.

The list generator 153, in response to a list request signal being supplied from the communication unit 151, conducts a list generation process that generates a content list on the basis of a meta sharing table and a preference table retained in the database 154, and transmits it to the recording and playback device 42 that originated the list request signal.

Herein, details of a list generation process conducted by the list generator 153 will be discussed later with reference to the flowchart in FIG. 8.

The database 154 retains the meta sharing table and the preference table.

[Explanation of Operation According to Database Registration Process]

Next, a database registration process conducted by a recording and playback device 42 will be explained.

Figure 5:
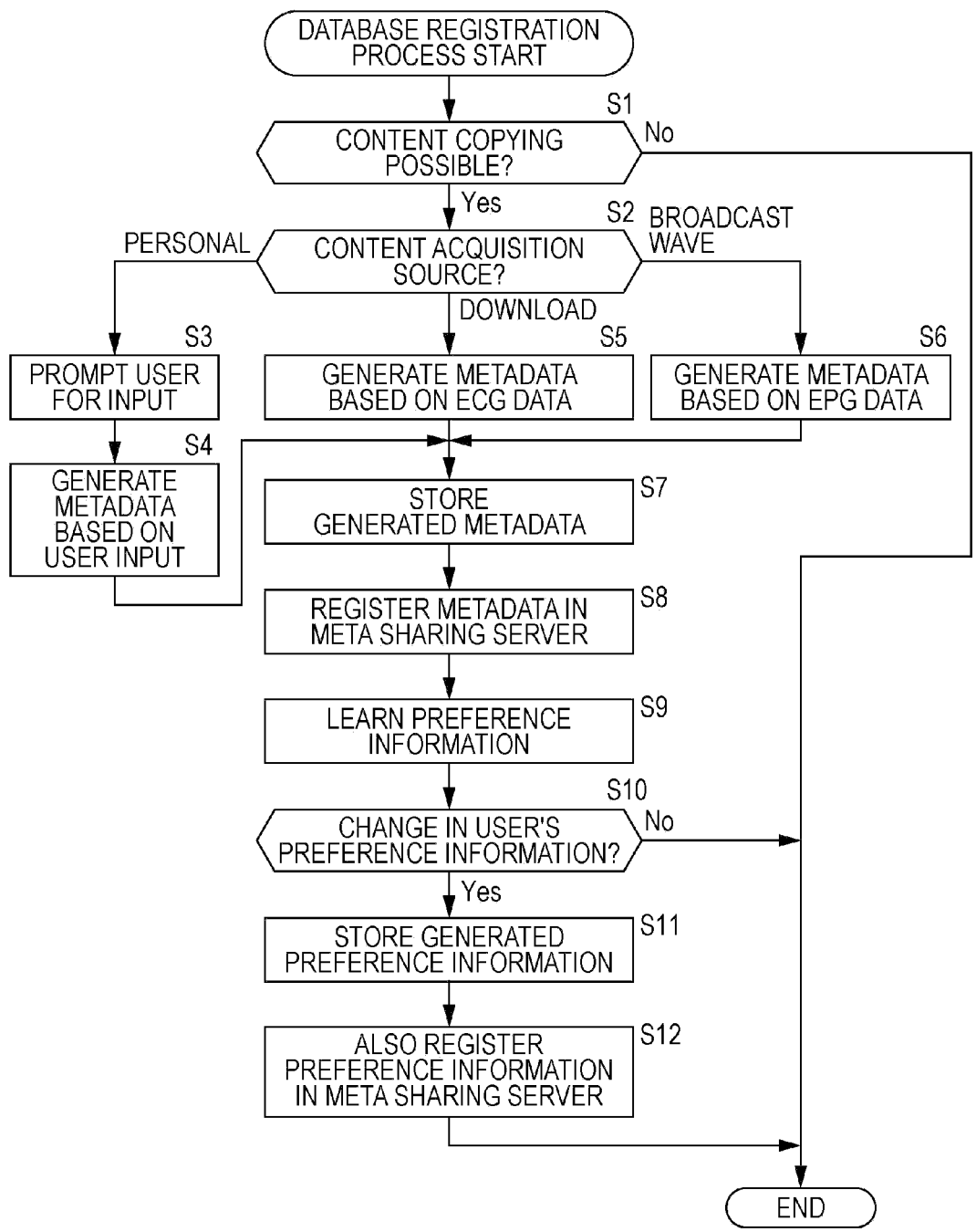
FIG. 5 is a flowchart for explaining a database registration process.

FIG. 5 is a flowchart for explaining a database registration process.

This database registration process is initiated when content is stored in the storage unit 105 of a recording and playback device 42, for example.

In a step S1, the registration processor 106 takes content stored in the storage unit 105 as target content. Then, the registration processor 106 reads out copy control information, which includes the metadata of the target content, from the storage unit 105.

The registration processor 106 determines whether or not the target content is copyable on the basis of the read out copy control information.

In step S1, if the registration processor 106 determines on the basis of the read out copy control information that the target content is copyable, then the content is treated as shareable and the process proceeds to a step S2.

In step S2, the registration processor 106 determines whether or not data corresponding to the target content (ECG data or EPG data, for example) exists, and in the case where data corresponding to the target content does exist, determines whether that data is ECG data or EPG data.

In the case where the registration processor 106 determines in step S2 that data corresponding to the target content does not exist, or in other words, in the case where it is determined that the target content is personal data stored by a user, the process proceeds to a step S3.

In step S3, the registration processor 106 generates (data expressing) an input screen prompting the user for the input of metadata, and supplies it to the output controller 109.

At this point, the output controller 109 supplies the generated input screen to the display device 43 via the output unit 110 and causes it to be displayed. In so doing, the user is able to input metadata by operating a remote control not illustrated while referring to the input screen displayed by the display device 43.

The registration processor 106, waits to be supplied with an operation signal from the remote control via the light receiver 111 according to user operations, and the process proceeds from step S3 to a step S4. Then, the registration processor 106 generates metadata for the target content on the basis of an operation signal from the light receiver 111.

Also, in the case where the registration processor 106 determines in step S2 that data corresponding to the target data does exist, and that that data is ECG data, or in other words, in the case where it is determined that the target content is downloaded data obtained by downloading from the network 22, etc., the process proceeds to a step S5. Then, in step S5, the registration processor 106 generates metadata for the target content on the basis of ECG data corresponding to the target content.

Furthermore, in the case where the registration processor 106 determines in step S2 that data corresponding to the target content does exist, and that that data is EPG data, or in other words, in the case where it is determined that the target content is broadcast data extracted from a received broadcast wave, the process proceeds to a step S6. Then, in step S6, the registration processor 106 generates metadata for the target content on the basis of EPG data corresponding to the target content.

After finishing the processing in step S4, step S5, or step S6, the process proceeds to a step S7. In step S7, the registration processor 106 supplies the generated target content metadata to the storage unit 105 and causes it to be stored.

In a step S8, the registration processor 106 registers the target content metadata stored in the storage unit 105 in the meta sharing server 23.

In other words, the registration processor 106 may for example control the uploader 104 to read out the target content metadata stored in the storage unit 105 and transmit it to the meta sharing server 23 via the communication controller 102, the communication unit 101, the router 41, and the network 22. Correspondingly, the meta sharing server 23 stores metadata from the network 22.

In a step S9, the registration processor 106 computes (learns) user preference information on the basis of metadata retained in the storage unit 105 as well as a playback history, etc. of the content corresponding to the metadata.

In a step S10, the registration processor 106 compares the computed preference information to preference information retained in the storage unit 105, and on the basis of the comparison result determines whether or not the computed preference information differs from the preference information retained in the storage unit 105.

In the case where the registration processor 106 determines in step S10 that the computed preference information differs from the preference information retained in the storage unit 105, the process proceeds to a step S11.

In step S11, the registration processor 106 supplies the computed preference information to the storage unit 105 and causes it to be stored by overwriting as new preference information.

In a step S12, the registration processor 106 registers the new preference information stored in the storage unit 105 in the meta sharing server 23.

In other words, the registration processor 106 may for example control the uploader 104 to read out the new preference information stored in the storage unit 105 and transmit it to the meta sharing server 23 via the communication controller 102, the communication unit 101, the router 41, and the network 22. Correspondingly, the meta sharing server 23 stores preference information from the network 22.

Meanwhile, in the case where the registration processor 106 determines on the basis of read out copy control information that the target content is not copyable in step S1, or in the case where the registration processor 106 determines that the computed preference information differs from the preference information retained in the storage unit 105 in step S10, the process ends.

Thus, the database registration process ends.

As explained above, in a database registration process, it is configured such that every time content is stored in the storage unit 105 of a recording and playback device 42, metadata is generated for the content stored in the storage unit 105 while user preference information is also generated, and the metadata or preference information is supplied to the meta sharing server 23 and made to be stored.

Consequently, in the meta sharing server 23, it becomes possible to keep a meta sharing table and preference table up-to-date on the basis of metadata and preference information from the recording and playback devices 42-1 to 42-N.

[Explanation of Operation According to Database Update Process]

Next, a database update process conducted by the meta sharing server 23 in accordance with a database registration process will be explained.

Figure 6:
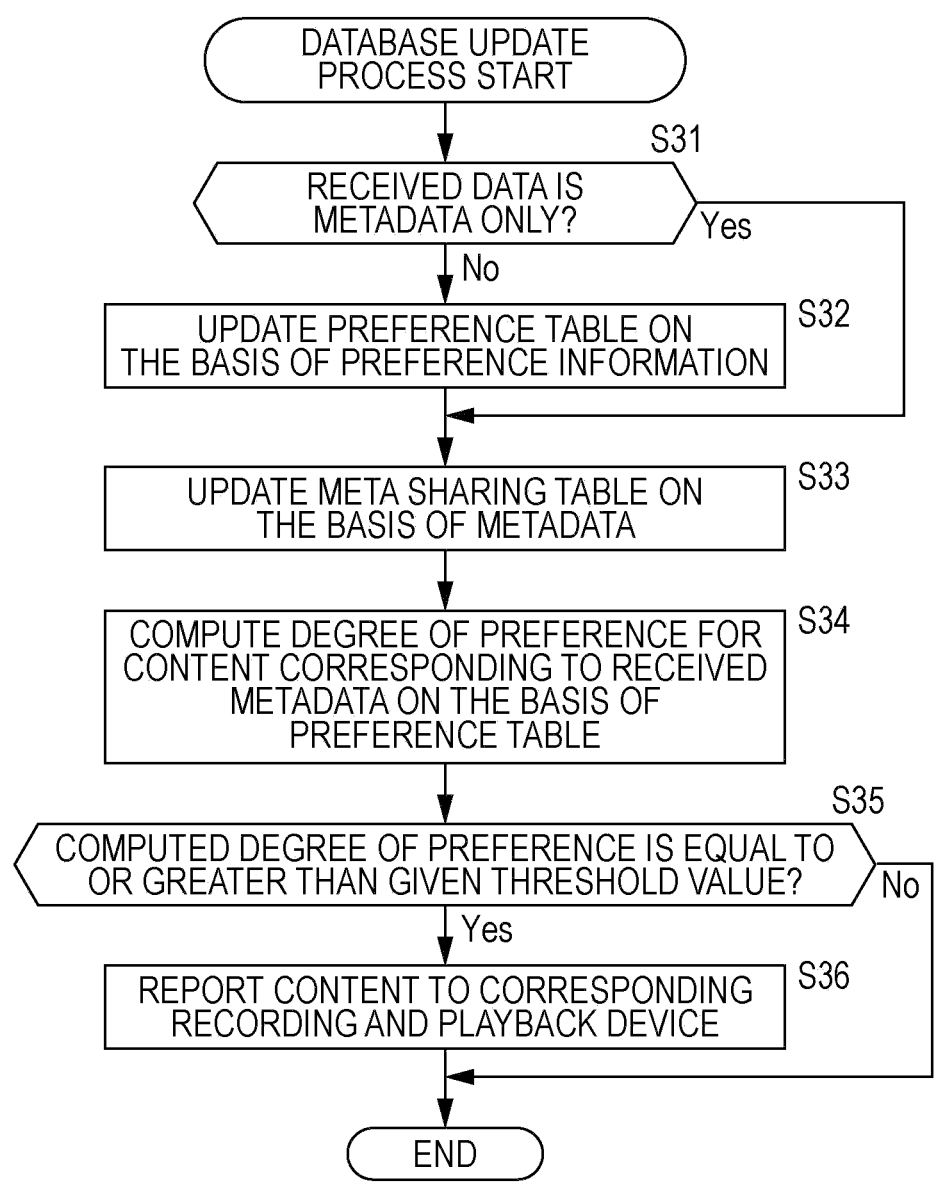
FIG. 6 is a flowchart for explaining a database update process.

FIG. 6 is a flowchart for explaining details of a database update process.

This database update process is initiated when received data, being metadata, preference information, etc. associated with the device ID of a recording and playback device 42, is supplied from a recording and playback device 42 to the meta sharing server 23, for example.

In a step S31, the communication unit 151 determines whether or not received data supplied from a recording and playback device 42 via the router 41 and the network 22 is metadata only.

Then, in the case where the communication unit 151 determines that the received data is not metadata only, or in other words, in the case where it is determined that metadata and preference information has been supplied as received data, the metadata and preference information is supplied from the communication unit 151 to the DB updater 152, and the process proceeds to a step S32.

In step S32, the DB updater 152 updates a preference table retained in the database 154 by overwriting the preference table with the preference information from the communication unit 151.

In a step S33, the DB updater 152 updates a meta sharing table retained in the database 154 by adding the metadata from the communication unit 151 to the meta sharing table.

Meanwhile, in the case where the communication unit 151 determines in step S31 that metadata only has been supplied as received data, the metadata is supplied from the communication unit 151 to the DB updater 152, and the process proceeds to step S33, skipping step S32.

In a step S34, the DB updater 152 reads out a preference table retained in the database 154.

Then, the DB updater 152 computes, on the basis of the preference table retained in the database 154, a degree of preference expressing the degree to which a user's preferences match the content indicated by a content ID included in the metadata from the communication unit 151. A degree of preference is computed for each respective device ID of the recording and playback devices 42 from the recording and playback devices 42-1 to 42-N, excluding the recording and playback device 42 that transmitted the received data.

In a step S35, the DB updater 152 determines whether or not the degrees of preference computed for each device ID are each equal to or greater than a given threshold value.

Then, in the case where the DB updater 152 determines that at least one degree of preference from among the degrees of preference computed for each device ID is equal to or greater than a given threshold value, the process proceeds to a step S36.

In step S36, the DB updater 152 generates report information addressed to a recording and playback device 42 indicated by a device ID corresponding to a degree of preference determined to be equal to or greater than a threshold value. The report information reports that it is possible to share (download) the content that matches the user's preferences. The DB updater 152 supplies generated report information to the communication unit 151 together with a device ID.

The communication unit 151, on the basis of a device ID from the DB updater 152, supplies report information from the DB updater 152 to the recording and playback device 42 indicated by the device ID from the DB updater 152 via the network 22 and the router 41.

Also, in the case where the DB updater 152 determines in step S35 that all degrees of preference computed for each device ID are not equal to or greater than a given threshold value, the process ends.

Thus, the database update process ends.

As explained above, in a database update process, it is configured such that a meta sharing table is updated in response to receiving metadata from a recording and playback device 42, and a preference table is updated in response to receiving preference information from a recording and playback device 42.

Consequently, in the meta sharing server 23, a meta sharing table and a preference table used to generate a content list in response to a list request signal from a recording and playback device 42 can be kept up-to-date.

For this reason, it becomes possible for the meta sharing server 23 to generate a content list on the basis of a meta sharing table and a preference table which are constantly kept up-to-date.

Also, in a database update process, it is configured such that a degree of preference with respect to content indicated by a content ID included in metadata from a recording and playback device 42 is computed for every other recording and playback device 42, and in the case where a computed degree of preference is equal to or greater than a given threshold value, information indicating that content matching the preferences of the user of another recording and playback device 42 has become shareable is reported to that other recording and playback device 42.

Consequently, in a recording and playback device 42, in the case where content matching the user's preferences has become shareable, information indicating such is reported from the meta sharing server 23. Thus, it becomes possible to more easily download content matching the user's preferences compared to the case of selecting and downloading content matching the user's preferences from a content list.

[Explanation of Operation According to Content Acquisition Process]

Next, a content acquisition process conducted by a recording and playback device 42 will be explained.

Figure 7:
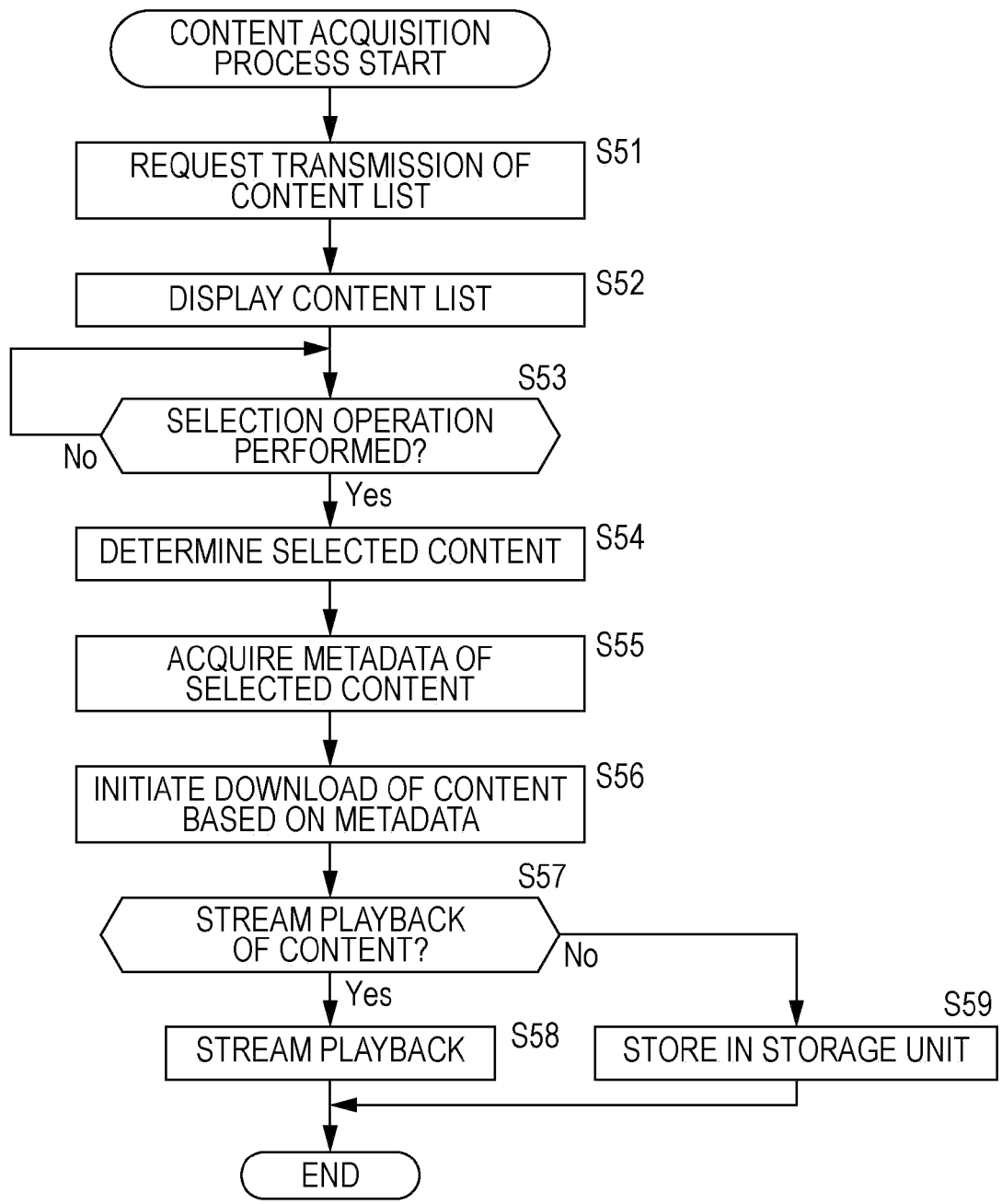
FIG. 7 is a flowchart for explaining a content acquisition process.

FIG. 7 is a flowchart for explaining details of a content acquisition process.

This content acquisition process is initiated when a user has conducted an instruction operation by means of a remote control not illustrated, which issues instructions to acquire a content list generated by the meta sharing server 23, for example.

At this point, an operation signal corresponding to the user's instruction operation is supplied to the acquisition processor 107 from a remote control not illustrated via the light receiver 111.

In a step S51, the acquisition processor 107, on the basis of the operation signal from the light receiver 111, generates a list request signal requesting transmission of a content list, and supplies it to the communication controller 102.

The communication controller 102 transmits the list request signal from the acquisition processor 107 to the meta sharing server 23 via the communication unit 101, the router 41, and the network 22.

The meta sharing server 23, in response to receiving a list request signal from the communication controller 102, conducts a list generation process (later discussed in FIG. 8) that generates a content list reflecting the preferences of the user of the recording and playback device 42 and transmits it to the recording and playback device 42.

In a step S52, the acquisition processor 107 supplies the output controller 109 with a content list supplied from the meta sharing server 23 via the network 22, the router 41, the communication unit 101, and the communication controller 102 in response to transmitting a list request signal.

Then, the output controller 109 causes the content list from the acquisition processor 107 to be supplied to and displayed by the display device 43 via the output unit 110.

In so doing, it becomes possible for the user to conduct a selection operation selecting given content from a content list displayed by the display device 43 by means of a remote control not illustrated, etc.

In a step S53, the acquisition processor 107 determines whether or not a selection operation has been conducted by the user, on the basis of whether or not an operation signal corresponding to a user's selection operation has been supplied from a remote control not illustrated, etc. via the light receiver 111.

The acquisition processor 107 repeats the processing in step S53 until determining that a selection operation has been conducted by the user on the basis of whether or not an operation signal has been supplied from the light receiver 111. Then, in the case where the acquisition processor 107 determines that a selection operation has been conducted by the user, the process proceeds from step S53 to a step S54.

In step S54, the acquisition processor 107 determines, on the basis of an operation signal from the light receiver 111, the content ID of the acquisition target content selected by the user's selection operation.

In a step S55, the acquisition processor 107 transmits the content ID of the acquisition target content to the meta sharing server 23 via the communication controller 102, the communication unit 101, the router 41, and the network 22.

The meta sharing server 23, in response to being supplied with a content ID from the network 22, reads out, from a retained meta sharing table, the device ID associated with metadata including the content ID from the network 22, and supplies it to the acquisition processor 107 via the network 22, the router 41, the communication unit 101, and the communication controller 102.

Meanwhile, in the case where the acquisition target content is being retained by a plurality of recording and playback devices 42, metadata including the content ID determined by the processing in step S54 is retained in the meta sharing server 23 in association with the respective device IDs of a plurality of recording and playback devices 42.

In this case, the meta sharing server 23, in response to being supplied with a content ID from the network 22, reads outs, from a retained meta sharing table, an arbitrary device ID from among the respective device IDs associated with metadata including the content ID from the network 22, and transmits it to the acquisition processor 107 via the network 22, the router 41, the communication unit 101, and the communication controller 102.

In a step S56, the acquisition processor 107 identifies a recording and playback device 42 retaining the acquisition target content on the basis of the device ID transmitted from the meta sharing server 23 in response to transmitting a content ID.

Then, the acquisition processor 107 transmits a download request for the acquisition target content to the identified recording and playback device 42.

The acquisition processor 107 controls the communication controller 102 and the downloader 103, etc. to initiate downloading of acquisition target content transmitted from the identified recording and playback device 42 in response to transmitting a download request.

In a step S57, the acquisition processor 107 generates a selection screen for prompting selection of whether or not stream the acquisition target content, and supplies it to the output controller 109.

The output controller 109 supplies the selection screen from the acquisition processor 107 to the display device 43 via the output unit 110 and causes it to be displayed.

The user, while referencing the selection screen displayed by the display device 43, conducts an instruction operation issuing instructions to stream the acquisition target content, or alternatively, to conduct processing to store it in the storage unit 105. When an instruction operation is conducted, the process proceeds from step S56 to a step S57.

In step S57, the light receiver 111 determines whether an operation signal corresponding to an instruction signal received from a remote control is an operation signal indicating that streaming playback has been instructed, or alternatively, an operation signal indicating that processing to store the acquisition target in the storage unit 105 has been instructed.

In the case where the light receiver 111 determines in step S57 that the received operation signal is an operation signal indicating that streaming playback has been instructed, the received operation signal is supplied to the playback controller 136, and the process proceeds to a step S58.

In step S58, the playback controller 136, on the basis of the operation signal from the light receiver 111, causes decryption and other processing necessary for playback to be conducted on content supplied to the decrypter 131 from the downloader 103, and causes the processed content to be output to the output controller 109.

The output controller 109 supplies the processed content to the display device 43 via the output unit 110 and causes it to be displayed.

Also, in the case where the light receiver 111 determines in step S57 that the received operation signal is an operation signal indicating that processing to store the acquisition target content in the storage unit 105 has been instructed, the received operation signal is supplied to the acquisition processor 107, and the process proceeds to a step S59.

In a step S59, the acquisition processor 107, on the basis of the operation signal from the light receiver 111, controls the downloader 103, supplies content from the communication controller 102 to the storage unit 105, and causes it to be stored. Meanwhile, a database registration process is initiated in response to the processing in step S59 being conducted.

Thus, the content acquisition process ends.

As explained above, in a content acquisition process, it is configured such that a user selects, on the basis of a content list from the meta sharing server 23, content to be streamed or stored in the storage unit 105.

Consequently, it becomes possible for a user to select, on the basis of a content list from the meta sharing server 23, content that the user desires, such as content, etc. that matches the user's preferences, for example.

[Explanation of Operation According to List Generation Process]

Next a list generation process conducted by the meta sharing server 23 will be explained.

Figure 8:
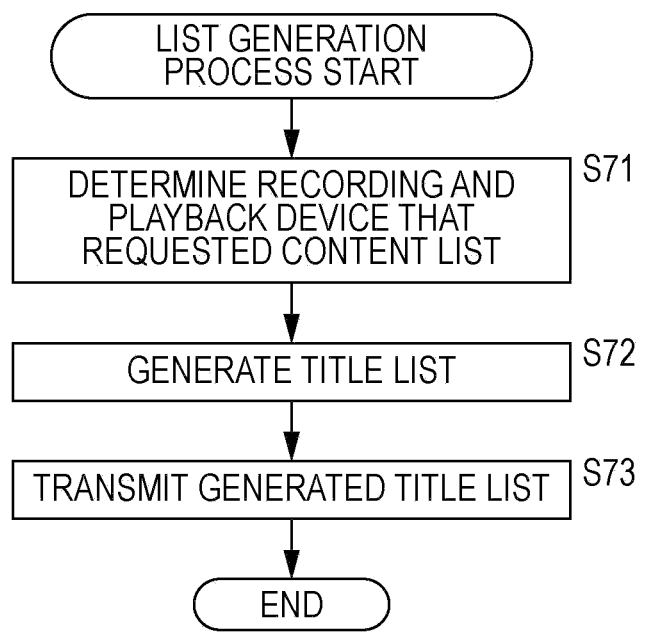
FIG. 8 is a flowchart for explaining a list generation process.

FIG. 8 is a flowchart for explaining details of a list generation process.

This list generation process is initiated when the communication unit 151 receives a list request signal transmitted from a recording and playback device 42 via the router 41 and the network 22.

At this point, the communication unit 151 supplies the received list request signal to the list generator 153.

In a step S71, the list generator 153 determines, on the basis of the list request signal from the communication unit 151, the device ID of the recording and playback device 42 that originated the list request signal. Herein, the device ID of a recording and playback device 42 is included in a list request signal.

In a step S72, the list generator 153 reads out preference information corresponding to the determined device ID of a recording and playback device 42 from a preference table retained in the database 154.

Also, the list generator 153 reads out a meta sharing table retained in the database 154.

Then, the list generator 153 generates a content list like that illustrated in FIG. 2 on the basis of the read out meta sharing table and preference information, and supplies it to the communication unit 151 together with the determined device ID.

In a step S73, the communication unit 151, on the basis of the device ID from the list generator 153, transmits the content list from the list generator 153 to the recording and playback device 42 that originated the list request signal via the network 22 and the router 41.

Thus, a list generation process ends.

As explained above, in a list generation process, it is configured such that a content list reflecting the preferences of the user of a recording and playback device 42 is generated in response to a list request signal being supplied from a recording and playback device 42, and the generated content list is transmitted to the corresponding recording and playback device 42.

Consequently, in a recording and playback device 42, it becomes possible for a user to select desired content on the basis of a content list reflecting the user's preferences.

2. Modifications

In the present embodiment, it is configured such that the meta sharing server 23 generates a content list with a recommended mark 81, etc. added to a content display 61c of content highly preferred by the user, for example, as a content list like that illustrated in FIG. 2. However, a content list generated in order to present recommended content to a user is not limited thereto.

In other words, it may also be configured such that the meta sharing server 23 generates a content list in which content displays are disposed in a recommendation order recommended to a user on the basis of a meta sharing table and preference information corresponding to the device ID of a recording and playback device 42, for example. It may also be configured such that the meta sharing server 23 generates a content list in which content displays are disposed in order of genres recommended to a user.

Also, it is possible for the meta sharing server 23 to generate a content list in which content displays corresponding to only content not retained in the recording and playback device 42 are disposed on the basis of only metadata not associated with the device ID of the recording and playback device 42, for example. In this case, a user is able to easily determine content not retained in the recording and playback device 42 according to a content list generated by the meta sharing server 23.

Consequently, it becomes possible for a user to more easily download compared to the case of selecting and downloading the content display of a content not retained in a recording and playback device 42 from a content list in which content displays for all content retained in the recording and playback devices 42-1 to 42-N are disposed.

Furthermore, in the case where a presently generated content list differs from a previously displayed content list in the meta sharing server 23 due to preference information and metadata retained in the meta sharing server 23 being updated by a database update process, it is possible to supply a recording and playback device 42 with a content list in which only the presently and newly generated content displays are disposed, and cause it to be displayed by the display device 43, for example.

Also, it may be configured such that the meta sharing server 23 generates a presently generated content list whereby presently and newly generated content displays can be distinguished from previously generated content displays.

In this case, it becomes possible for a user to easily distinguish presently and newly added content displays from previously generated content displays.

In the present embodiment, it is configured such that content respectively retained in the recording and playback devices 42-1 to 42-N can be respectively shared (downloaded) among the recording and playback devices 42-1 to 42-N, but an embodiment is not limited thereto.

In other words, a recording and playback device 42 (the recording and playback device 42-1, for example) may for example register permission information in the meta sharing server 23 which indicates whether or not its own retained content is permitted to be downloaded by another recording and playback device 42 (the recording and playback device 42-2, for example). In so doing, it is possible to configure a recording and playback device 42 such that downloading of its own retained content is permitted or denied with respect to another recording and playback device 42.

In this case, it becomes possible for another recording and playback device 42 (the recording and playback device 42-2, for example) to download content from a recording and playback device 42 only in the case where the downloading of content from the recording and playback device 42 (the recording and playback device 42-1, for example) is permitted according to permission information.

Consequently, it becomes possible for a recording and playback device 42 to restrict content shared with other recording and playback devices 42, for example.

Consequently, it becomes possible to share content only within a limited group of recording and playback devices 42 from among the recording and playback devices 42-1 to 42-N, for example.

Meanwhile, in the meta sharing server 23, it may be configured such that in the case where a list request signal is supplied from another recording and playback device 42, a content list consisting of only content displays of content downloadable from a recording and playback device 42, etc. by another recording and playback device 42 is generated on the basis of permission information.

In the content acquisition process in the present embodiment, it was configured such that in the case where acquisition target content is being retained by a plurality of recording and playback devices 42, in step S56 the acquisition processor 107 initiates downloading of the acquisition target content from a recording and playback device 42 identified by an arbitrary device ID supplied from the meta sharing server 23.

However, in step S56 it is possible to initiate downloading of acquisition target content in the acquisition processor 107 from the recording and playback device 42 able to communicate with the fastest communication rate from among the recording and playback devices 42 retaining the acquisition target content.

In other words, if the registration processor 106 in the recording and playback device 42 is configured to register (data expressing) a communication rate given by the recording and playback device 42 in association with the device ID in the (database 154 of) the meta sharing server 23, then the respective communication rates of the recording and playback devices 42-1 to 42-N will be retained in the meta sharing server 23 in association with device IDs.

In this case, according to the processing in step S55, it is possible for the meta sharing server 23, in response to being supplied with a content ID from a recording and playback device 42, to supply the acquisition processor 107 with the device ID associated with the fastest communication rate from among the device IDs of a plurality of recording and playback devices 42 retaining the acquisition target content.

Consequently, in the acquisition processor 107, it becomes possible to identify (determine), on the basis of a device ID from the meta sharing server 23, the recording and playback device 42 that communicates with the fastest communication rate, and more rapidly download acquisition target content from the identified recording and playback device 42.

A database registration process in the present embodiment was configured to be initiated when content is stored in the storage unit 105, but it may also be configured to be periodically initiated at a given interval, for example.

Also, in the present embodiment, it was configured such that metadata and preference information respectively generated by the recording and playback devices 42-1 to 42-N are stored in the meta sharing server 23, but it may also be configured such that only metadata is stored in the meta sharing server 23.

In this case, in step S51 of a content acquisition process, the recording and playback device 42 transmits preference information retained in the storage unit 105 addressed to the meta sharing server 23 together with a list request signal.

Then, in step S72 of a list generation process, the meta sharing server 23 will generate a content list on the basis of preference information from the recording and playback device 42 and retained metadata.

In the case where it is configured such that only metadata is stored in the meta sharing server 23, it becomes possible to reduce the memory capacity in the meta sharing server 23 compared to the case of configuring it such that both metadata and preference information are stored.

Also, in the present embodiment, it was configured such that the recording and playback device 42 and the meta sharing server 23 are separately constituted, but it may also be configured such that one recording and playback device 42 from among the recording and playback devices 42-1 to 42-N is provided with the meta sharing server 23.

Furthermore, it is possible to configured it such that, instead of the meta sharing server 23, the recording and playback device 42 retains metadata for its own retained content, for example.

In this case, when a recording and playback device 42 (the recording and playback device 42-1, for example) wants to acquire a content list of content retained by another recording and playback device 42 (the recording and playback device 42-2, for example), it supplies a list request signal to the other recording and playback device 42 together with preference information learned by the recording and playback device 42, for example.

Then, the other recording and playback device 42, in response to being supplied with a list request signal and preference information from the recording and playback device 42, generates a content list reflecting the preferences of the user of the recording and playback device 42 while referencing preference information from the recording and playback device 42 and on the basis of metadata of the content that the other recording and playback device 42 itself retains, and supplies the generated content list to the recording and playback device 42.

Also, it may be configured such that the recording and playback device 42 retains preference information learned by another recording and playback device 42, while also retaining metadata of content the recording and playback device 42 itself retains.

In this case, since preference information learned by another recording and playback device 42 is retained in the recording and playback device 42, it becomes possible for another recording and playback device 42 to cause the recording and playback device 42 to generate a content list reflecting the preferences of the user of the recording and playback device 42 by simply supplying the recording and playback device 42 with a list request signal, and without supplying preference information learned by the other recording and playback device 42, for example.

Herein, it is possible to adopt a hard disk recorder, etc. housing a hard disk as the recording and playback device 42, for example.

Next, the series of process discussed above may be executed by special-purpose hardware, and may also be executed by software. In the case of executing the series of processes by software, a program constituting such software is installed from a recording medium onto what is called an embedded computer, or alternatively, onto for example a general-purpose personal computer, etc. able to execute various functions by installing various programs thereon.

[Exemplary Configuration of Computer]

Figure 9:
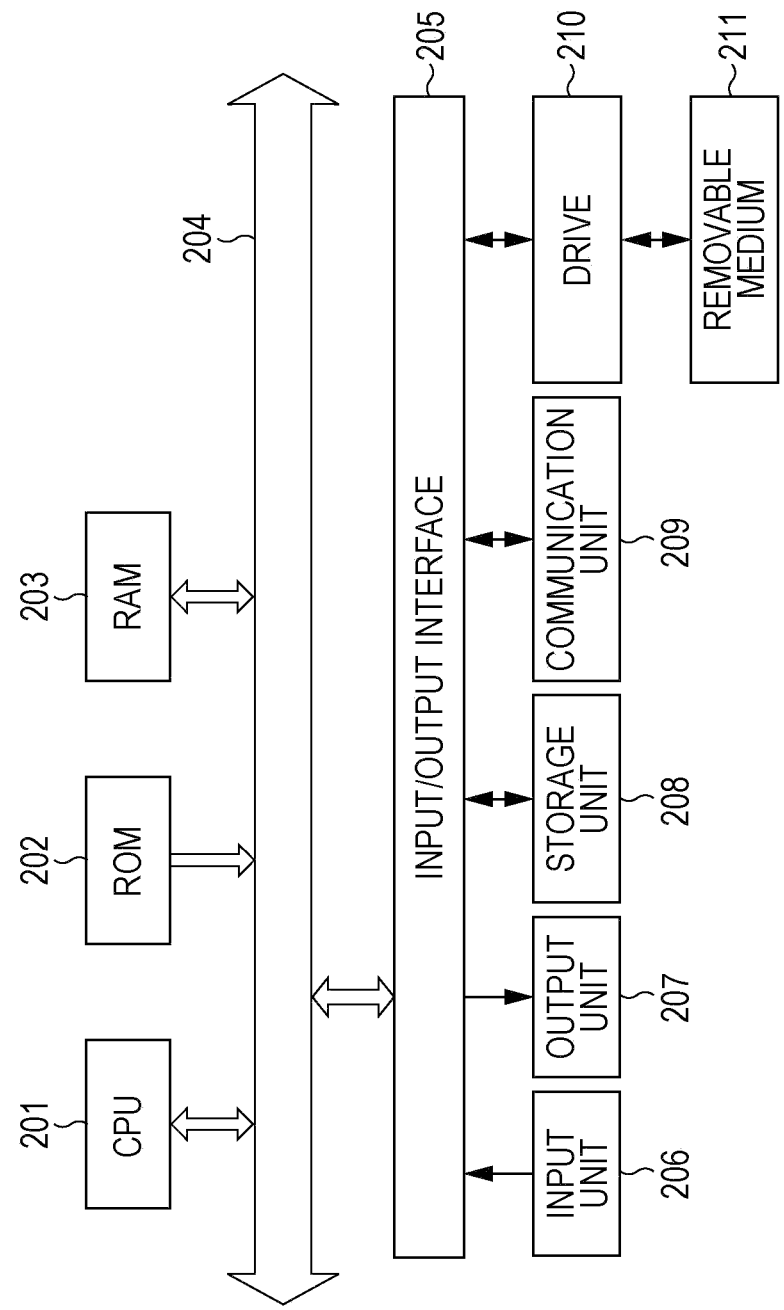
FIG. 9 is a block diagram illustrating an exemplary configuration of a computer.

FIG. 9 illustrates an exemplary configuration of a computer that executes the series of processes discussed above with a program.

A CPU (Central Processing Unit) 201 executes various processes by following a program stored in ROM (Read Only Memory) 202 or a storage unit 208. Programs executed by the CPU 201 and data, etc. are stored as appropriate in RAM (Random Access Memory) 203. The CPU 201, the ROM 202, and the RAM 203 are connected to each other by a bus 204.

An input/output interface 205 is also connected to the CPU 201 via the bus 204. Connected to the input/output interface 205 are an input unit 206 comprising a keyboard, mouse, microphone, etc., and an output unit 207 comprising a display, speakers, etc. The CPU 201 executes various processes in response to commands input from the input 206. Then, the CPU 201 outputs processing results to the output unit 207.

A storage unit 208 connected to the input/output interface 205 comprises a hard disk, for example, and stores programs executed by the CPU 201 and various data. A communication unit 209 communicates with external apparatus via a network such as the Internet or a local area network.

Also, a program may be acquired via the communication unit 209 and stored in the storage unit 208.

When a removable medium 211 such as a magnetic disk, optical disc, magneto-optical disc, or semiconductor memory is loaded into a drive 210 connected to the input/output interface 205, the drive 210 drives the medium and acquires programs and data, etc. recorded thereon. Acquired programs and data are transferred to the storage unit 208 and stored as necessary.

A recording medium having recorded thereon a program that is installed onto a computer and put into an executable state by the computer may consist of a removable medium 211 as illustrated in FIG. 9, the removable medium 211 being a packaged medium consisting of a magnetic disk (including flexible disk), an optical disc (including CD-ROM (Compact Disc-Read Only Memory) and DVD (Digital Versatile Disc)), a magneto-optical disc (including MD (Mini-Disc)), or semiconductor memory, etc. Alternatively, the recording medium may consist of ROM 202 or the hard disk, etc. constituting the storage unit 208, upon which the program is temporarily or permanently recorded. The recording of the program onto the recording medium is conducted as necessary via the communication unit 209, which is an interface such as a router, modem, etc., and utilizing a wired or wireless communication medium such as a local area network, the Internet, or digital satellite broadcasting.

Herein, in this specification, the steps stating the program recorded onto the recording medium may obviously include processes conducted in a time series following the described sequence, and may also include processes executed in parallel or individually without necessarily being processed in a time series.

Also, in this specification, a system expresses the totality of an apparatus composed of a plurality of apparatus.

Furthermore, the present embodiment is not limited to the embodiment discussed above, and various modifications are possible within a scope that does not depart from the principal matter of the present invention.

REFERENCE SIGNS LIST

1 communication system
22 network
23 meta sharing server
41-1 to 41-N router
42-1 to 42-N recording and playback device
43-1 to 43-N display device
101 communication unit
102 communication controller
103 downloader
104 uploader
105 storage unit
106 registration processor 107 acquisition processor
108 playback processor
109 output controller
110 output unit
111 light receiver
151 communication unit
152 DB updater
153 list generator
154 database

The invention claimed is:

1. A communication method for use with a communication apparatus connectable via a network to another communication apparatus, the method including the steps of:
generating metadata related to content retained by the communication apparatus;
learning preference information expressing preferences for the content on the basis of the metadata;
registering the metadata and the preference information in a database;
requesting the other communication apparatus via the network for content retained by the other communication apparatus on the basis of metadata generated by the other communication apparatus; and
supplying via the network the content retained by the communication apparatus to the other communication apparatus requesting on the basis of the generated metadata;
wherein the generating step
determines whether electronic program guide (EPG) data or electronic contents guide (ECG) data associated with the content exists, and when a determination result thereof indicates that one of the EPG data or the ECG data exists determines whether the data is the EPG data or the ECG data,
generates the metadata on the basis of the EPG data when the EPG data which is associated with the content is determined to exist,
generates the metadata on the basis of the ECG data when the ECG data which is associated with the content is determined to exist, and
generates the metadata on the basis of user information input by user input operations in the case where neither the EPG data nor the ECG data associated with the content is determined to exist.

2. A communication apparatus, connectable via a network to another similarly configured communication apparatus, comprising:
a storage device configured to retain content; and
a processing device configured, upon execution of a program accessible by the communication apparatus, to
(i) generate metadata related to the content,
(ii) learn preference information expressing preferences for the content based on the metadata,
(iii) register the metadata and the preference information in a database,
(iv) request from the other communication apparatus via the network content retained by the other communication apparatus based on metadata generated by the other communication apparatus, and
(v) cause the content retained by the storage device to be supplied via the network to the other communication apparatus requesting on the basis of metadata generated by the processing device,
in which to generate the metadata the processing device is configured to determine whether electronic program guide (EPG) data or electronic contents guide (ECG) data associated with the content exists and when a determination result thereof indicates that one of the EPG data or the ECG data exists determine whether the data is the EPG data or the ECG data, generate the metadata based on the EPG data when the EPG data which is associated with the content is determined to exist, generate the metadata based on the ECG data when the ECG data which is associated with the content is determined to exist, and generate the metadata based on user information input by user input operations when neither the EPG data nor the ECG data associated with the content is determined to exist.

3. The communication apparatus according to claim 2, in which metadata related to content retained by the other communication apparatus is also registered in the database, and in which the processing device is further configured, upon execution of the program, to acquire a content list, which is a list of content, generated based on the preference information and the metadata registered in the database.

4. The communication apparatus according to claim 3,
in which the communication apparatus is connectable via the network to a meta sharing server that retains the database, and
in which the processing device is further configured, upon execution of the program, to register the metadata and the preference information in the database via the network, and to request supply of the content list from the meta data sharing server which generates the content list based on the preference information and the metadata registered in the database, and to acquire the content list generated and supplied by the meta sharing server in response to the request for supply of the content list.

5. The communication apparatus according to claim 3, in which the processing device is further configured, upon execution of the program, to request from the other communication apparatus content selected by the user based on the content list acquired by the processing device.

6. The communication apparatus according to claim 5,
in which the communication apparatus is connectable via the network to a plurality of the other communication apparatus, and
in which when the content selected by the user is being retained by a plurality of other communication apparatus, the processing device is further configured, upon execution of the program, to request a given other communication apparatus for the content selected by the user.

7. The communication apparatus according to claim 6, in which the processing device is further configured, upon execution of the program, to also register in the database a communication rate when the content is supplied.

8. The communication apparatus according to claim 7,
in which respective communication rates of the plurality of other communication apparatus are registered in the database, and
in which the processing device is further configured, upon execution of the program, to determine based on the communication rates registered in the database the other communication apparatus from among the plurality of other communication apparatus that will supply the content with a fastest communication rate, and to request from the determined other communication apparatus the content selected by the user.

9. The communication apparatus according to claim 2,
in which preference information expressing preferences for content learned on the basis of metadata related to content retained by the other communication apparatus is registered in the database, and in which the processing device is further configured, upon execution of the program, to generate a content list which is a list of content based on the preference information and the metadata registered in the database and in response to a request from the other communication apparatus, and to cause the generated content list to be supplied to the other communication apparatus.

10. The communication apparatus according to claim 9, in which the processing device is further configured, upon execution of the program, to compute in response to the metadata being registered in the database a degree of preference expressing the degree of preference for the content corresponding to the metadata based on the preference information registered in the database, and to cause reporting to the other communication apparatus via the network that the content is retained in the storage device when the degree of preference is equal to or greater than a given threshold value.

11. The communication apparatus according to claim 2, in which the processing device is further configured, upon execution of the program, to also register in the database permission information indicating that supply of the content to the other communication apparatus is permitted or denied, and to cause the content to be supplied to the other communication apparatus when the permission information registered in the database indicates that supply of the content to the other communication apparatus is permitted.

12. A communication system comprising a meta sharing server configured to retain a database and a communication apparatus connected via a network to the meta sharing server,
in which the communication apparatus comprises:
a first processing device configured, upon execution of a program accessible by the communication apparatus, to
(i) generate metadata related to the content,
(ii) learn preference information expressing preferences for the content based on the metadata,
(iii) register, via the network, the metadata and the preference information in the database where metadata generated by a plurality of communication apparatus is generated,
(iv) request from the meta sharing server, via the network, a content list which is a list of content, and
(v) control acquiring of the content list supplied from the meta sharing server in response to a request from the processing device,
in which to generate the metadata the processing device is configured to determine whether electronic program guide (EPG) data or electronic contents guide (ECG) data associated with the content exists and when a determination result thereof indicates that one of the EPG data or the ECG data exists determine whether the data is the EPG data or the ECG data, generate the metadata based on the EPG data when the EPG data which is associated with the content is determined to exist, generate the metadata based on the ECG data when the ECG data which is associated with the content is determined to exist, and generate the metadata based on user information input by user input operations when neither the EPG data nor the ECG data associated with the content is determined to exist, and
in which the meta sharing server comprises:
a second processing device configured, upon execution of a program accessible by the meta sharing server, to
(i) generate the content list based on the metadata and the preference information registered in the database in response to a request by the first processing device, and
(ii) control supply of the content list to the communication apparatus via the network.

* * * * *